United States Patent
Bieker et al.

(10) Patent No.: US 7,367,433 B2
(45) Date of Patent: May 6, 2008

(54) DISC BRAKE WITH PRESSURE PIECE

(75) Inventors: Dieter Bieker, Oberaudorf (DE);
Johann Baumgartner, Moosburg (DE);
Robert Trimpe, Wessling (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 57 days.

(21) Appl. No.: 10/522,755

(22) PCT Filed: Jul. 24, 2003

(86) PCT No.: PCT/EP03/08119

§ 371 (c)(1),
(2), (4) Date: Dec. 22, 2005

(87) PCT Pub. No.: WO2004/013510

PCT Pub. Date: Feb. 12, 2004

(65) Prior Publication Data

US 2006/0124405 A1 Jun. 15, 2006

(30) Foreign Application Priority Data

Jul. 29, 2002 (DE) .................. 102 34 641
Dec. 16, 2002 (DE) .................. 102 58 749

(51) Int. Cl.
*F16D 55/02* (2006.01)
(52) U.S. Cl. .................. 188/71.7; 188/73.1; 188/72.7; 188/72.8; 188/71.8
(58) Field of Classification Search .............. 188/73.1, 188/72.7, 72.8, 71.7, 71.8, 71.9

See application file for complete search history.

(56) References Cited

U.S. PATENT DOCUMENTS

| 3,486,589 | A |   | 12/1969 | Hillegass |
|---|---|---|---|---|
| 4,222,310 | A | * | 9/1980 | Garrett et al. ................. 92/128 |
| 4,527,668 | A |   | 7/1985 | Davidson |
| 4,583,623 | A | * | 4/1986 | Ritsema .................. 188/264 G |
| 4,615,417 | A |   | 10/1986 | Schneider et al. |
| 4,796,729 | A | * | 1/1989 | Viscogliosi ................. 188/71.7 |
| 5,520,267 | A | * | 5/1996 | Giering et al. ............. 188/72.9 |
| 5,722,516 | A |   | 3/1998 | Forni et al. |
| 5,833,035 | A | * | 11/1998 | Severinsson ................ 188/72.7 |
| 6,659,235 | B2 | * | 12/2003 | Ortegren et al. ......... 188/73.31 |
| 6,668,981 | B2 | * | 12/2003 | Ortegren et al. ............ 188/72.2 |
| 7,032,721 | B2 | * | 4/2006 | Baumgartner .............. 188/71.9 |
| 7,086,504 | B2 | * | 8/2006 | Baumgartner et al. ..... 188/71.9 |
| 7,182,184 | B2 | * | 2/2007 | Baumgartner ............... 188/156 |
| 2006/0118365 | A1 | * | 6/2006 | Fischer et al. ............ 188/18 A |

FOREIGN PATENT DOCUMENTS

| DE | 39 19 179 A1 | 12/1990 |
|---|---|---|
| DE | 94 10 454 U1 | 12/1995 |
| DE | 197 06 298 A1 | 10/1997 |
| EP | 1 160 476 A2 | 12/2001 |
| GB | 2 074 261 A | 10/1981 |
| WO | WO 01/36837 A1 | 5/2001 |
| WO | WO 02/14125 A2 | 2/2002 |

* cited by examiner

*Primary Examiner*—Robert A. Siconolfi
*Assistant Examiner*—James Kuang-Yuen Hsiao
(74) *Attorney, Agent, or Firm*—Crowell & Moring LLP (57) ABSTRACT

A disc brake for a commercial vehicle, operated pneumatically or by electric motor, comprising a brake caliper, an application device and at least one adjuster device arranged with the brake caliper, is characterized in that both adjuster elements of the at least one adjuster device are fixed in a non-rotating manner to a common connector plate in the region thereof facing the brake lining and/or a single- or multi-piece thermal insulation layer is at least partly applied to the connector plate or parts connected thereto on the side thereof facing the relevant braking lining to form a region like a pressure piece.

21 Claims, 7 Drawing Sheets

DISC BRAKE WITH PRESSURE PIECE

BACKGROUND AND SUMMARY OF THE INVENTION

The present invention concerns a pneumatically and/or electromotively actuable disc brake.

Disc brakes are known, e.g. as sliding caliper disc brakes, swivel caliper disc brakes, or fixed caliper disc brakes.

Sliding caliper disc brakes require a fixed-axis component or carriers, which carries the brake linings effective at one side of the disc brake, and which absorbs its peripheral force when the disc brake is activated, and also holds the caliper displaceably lodged in parallel to the axis of the vehicle. The relative movement, which the caliper performs against the fixed-axis component, can be divided into a power stroke and wear stroke.

To balance the wear of the brake lining and/or disc brake, at least one adjustment device is arranged in the caliper, which acts upon the brake lining by means of one or two pressure pieces that are displaceable essentially axially to the disc brake, in order to adjust the distance between the brake lining and the brake disc.

If separate adjustment devices are arranged on both sides of the brake disc, it is merely necessary to align the displacement path of the brake disc in such a way that the release clearance can be overcome and the elastic deformation of the brake lining and the caliper, in other words the power stroke, can be balanced out (see e.g. PCT/EP01/09366).

The adjustment devices provided on both sides of the disc brake consist e.g. of adjustment sleeves, which, as adjustment elements of an electric motor or another mechanical device, are pivotable via a gear. These adjustment sleeves consist of an inside thread, into which a bolt-like spindle of the respectively thereto arranged pressure piece is screwed, so that with appropriate rotation, a relative axial movement is provided between the adjustment sleeves and the pressure pieces. Also known is a reverse arrangement, in which the pressure pieces have a sleeve-like spindle, which is pivotable on a bolt that forms the adjustment element.

The brake lining material is directly connected to the lining support, which in turn is either connected with the pressure piece, or rests against the pressure piece "loosely" without connection.

From German Patent document DE 42 30 005 A1, a disc brake with a sliding caliper is known, in which on each side of the disc brake, two pressure pieces arranged next to one another each act on a lining support of a brake lining, which is equipped with a lining support material.

A disadvantage of these known constructions lies in the fact that the frictional heat that is generated during a braking action is conducted through all components of the adjustment device without any blockage, whereby the downstream functional elements are exposed to a special stress, which reduces the service life. This is especially of concern when electric motors are employed as drive units for the adjustment devices.

Since disc brakes, which are utilized in utility or commercial vehicles, are subjected to the highest stresses, this issue is of particular significance, especially in terms of economy, since a shortened service life, and consequently the replacement of the corresponding functional elements, entails not only repair costs, but also costs that arise from the necessary out of service time of the utility vehicle.

From German Patent document DE 39 19 179, a disc brake is known, in which, at the side of the brake lining that faces the pressure piece, an insulating board is mounted at the lining support, which reduces the flow of heat between the brake lining and the pressure piece. Since a high generation of heat at the brake disc and the brake linings is obtained with braking, the insulating board protects the inside of the caliper—that is the brake application unit and the adjustment device—against overheating. The problem can be minimized by means of this solution.

It is also necessary to keep the pressure pieces and the adjustment elements torsion-resistant, in order to achieve, in conjunction with stationary, yet pivotable corresponding elements, such as adjustment sleeves with an inside thread, in which the adjustment elements are provided as a thread spindle, an axial movement of the thrust pieces.

The present invention is, therefore, based on the objective of further developing a disc brake of the above-mentioned type such that, with constructively minor measures, on the one hand during braking actions a reduced heat conduction into the inside of the caliper, and/or a constructively simple method for securing torsion-resistance of the adjustment elements and their corresponding elements, is achieved.

This objective is attained with a pneumatically and/or electromotively actuable disc brake for a utility vehicle, having a caliper that straddles a disc brake, at least one brake application unit arranged in the caliper for clamping the disc brake, and at least one adjustment device arranged in the caliper to offset brake lining wear, and/or brake disc wear by adjusting a distance between at least one brake lining, and the brake disc, which consists of two axially displaceable adjustment elements, each with a pressure piece, wherein the two adjustment elements of the at least one adjustment device are fixed torsion-resistantly in their areas that face the respective brake lining at a common connection plate, and/or at the connection plate, and/or at the pressure piece on the side facing the respective brake lining, a single- or multi-part heat-insulating layer is attached at least sectionwise.

Accordingly, the two adjustment elements of the at least one single adjustment device, are attached torsion-resistantly in their area facing their respective brake lining, on a common connection plate; and/or at the connection plate, and/or at the pressure piece on the side facing the respective brake lining a one-part or multi-part heat-insulating layer(s) is/are attached at least in sections.

As compared with the state of the art, this connection plate in its function as securing torsion-resistance offers not only substantial advantages as far as production and assembly are concerned, due to its simple construction, but also functional advantages, since the connection plate always remains at the same position on the pressure pieces, i.e. the connection plate moves according to the axial displacement of the pressure pieces along with them.

Thereby, in addition to the constructively uncomplicated securing of torsion-resistance of the pressure pieces, a protection of the downstream functional components from the effects of heat is also effectively enabled via simple means; this is achieved on the one hand by the connection plate itself, and on the other hand by the layer on this plate, or at the pressure piece.

Thereby, strain caused by the excessive heating of the parts arranged in the inside of the caliper, or an impairment of their ability to function during continuous or frequent heating with the resulting issues described in the state of the art, are prevented.

Preferably, the connection plate is realized as a thermal shield, which is dimensioned in such a way that it covers the opening of an installation space in the caliper, in which the adjustment device is placed, covered to a large extent. In addition, the opening may be closed by a further cover plate, which is screwed in at the opening of the caliper, and therefore is not axially displaceable, and has breakthroughs for the thrust elements.

It is extremely advantageous if the heat-insulating layer is realized in one part or several parts, and is directly mounted onto the connection plate. The layer may consist of one or two ceramic plates, which protrude over the pressure piece beyond its largest diameter dimension, wherein this ceramic plate is mounted on the connection plate, which is connected form flush and/or force flush with the pressure pieces, and which functions as heat protection, and as a device for securing torsion-resistance for the two pressure pieces of an adjustment device.

According to a further preferred modification, a pressure piece that forms the thrust piece plate is positioned upon the connection plate, and supports the heat-insulating layer. It is also contemplated, however, to place a ceramic layer on the pressure piece plate. In this manner, the connection plate is clamped by the pressure piece plate.

Preferably, the pressure piece plate is held at the connection plate form flush in an axial direction and torsion-resistant.

Especially preferably, the pressure piece plate has recesses that face the connection plate, which are contact-free in the material.

According to a further advantageous modification, the connector plate, in turn, has protuberances in the connection area with the adjustment elements facing the brake lining, in which protuberances the adjustment elements are appointed in a simple manner axially, and torsion-resistantly.

It is thus a further advantage for the cylinder-shaped protuberance to have stop notches formed in its surface area, which are realized in the interior of the protuberance in the form of catch grooves, and which on the outside correspond to catch grooves on the pressure piece plate, and on the inside correspond to noses of the adjustment element, and thus especially allow for a simple assembly of these constructional elements.

According to a further modification, the area embedded in the protuberance of the adjustment element has on its surface side slots that break through the material. In order to achieve optimized heat insulation, the pressure piece plate may also be provided with breakthroughs, which are, for example, arranged next to one another in a radial direction, and which effect heat insulation in this area. In each of these cases, the pressure piece plate and the pressure piece are connected torsion-resistantly to the connector plate.

In addition, expansion bellows may be connected at the connector plate, covering the respective adjustment elements as protection.

According to a further—also to be considered separately—modification of the invention, the pressure pieces and the lining support are each connected to one another in such a way that—continuously and in a simple way—a retraction of the brake lining is guaranteed, when the adjustment elements are turned back and when the brake is released.

With respect to the construction, it is a special advantage if, at the pressure piece, or at a component of the adjustment element connected with this, one or several plate springs are arranged, which undercut a rod in a recess of the lining support. As an alternative, one or more plate springs may be arranged at the lining support, which undercut the pressure piece or a component of the adjustment element connected to it.

Further advantageous embodiments of the invention are described and claimed herein.

Exemplary embodiments of the invention are described in the following by way of the enclosed drawings.

DETAILED DESCRIPTION OF THE DRAWINGS

Figure 1:
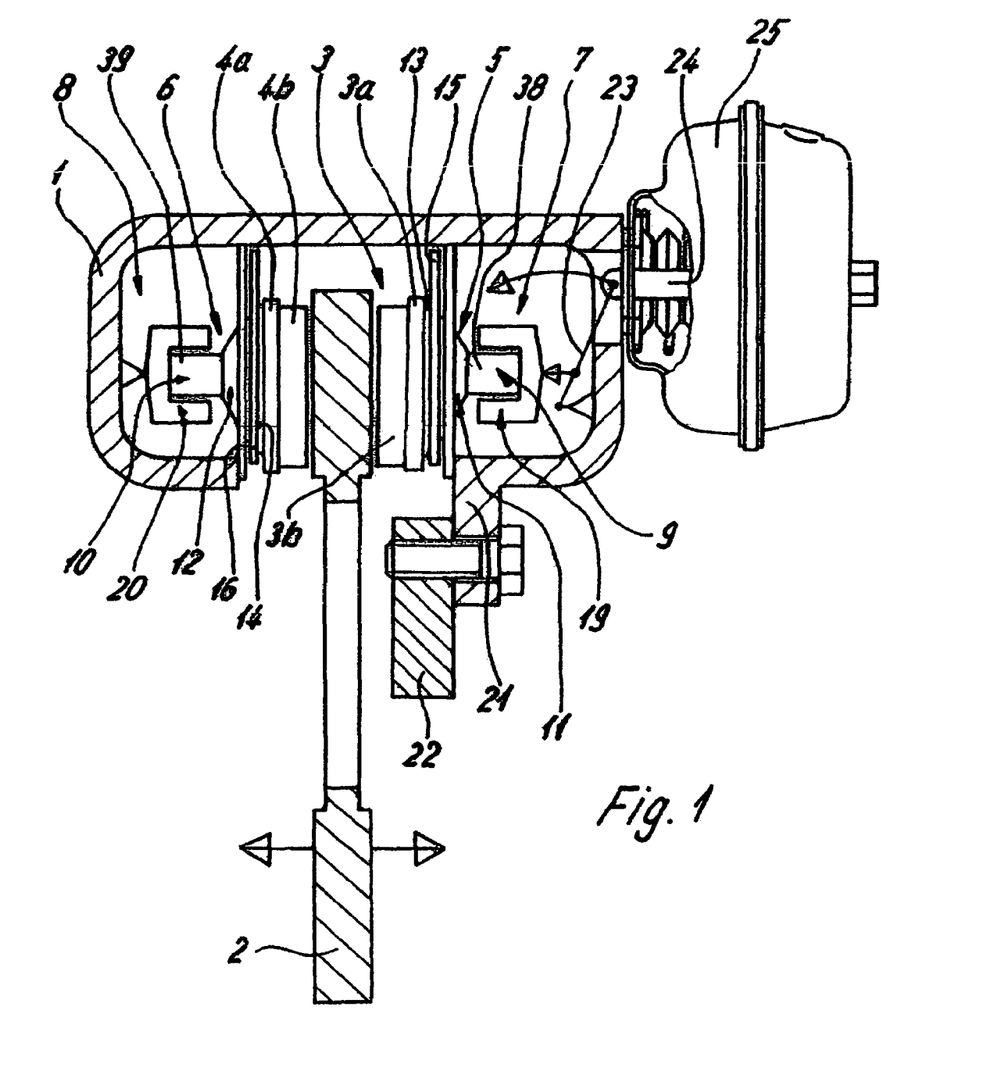
FIG. 1 is a schematic illustration of the disc brake in a sectional side view.
Figure 2:
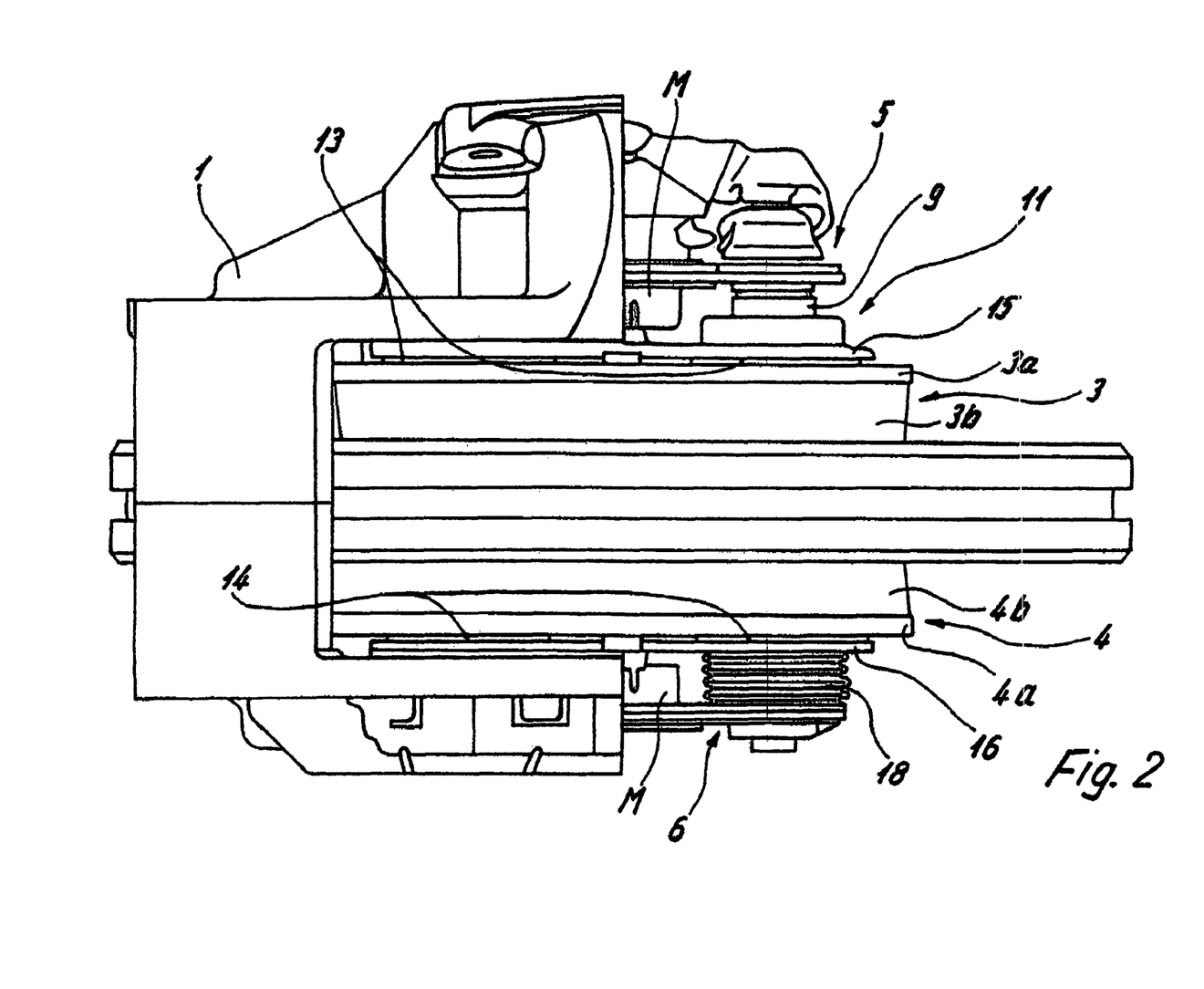
FIG. 2 is a partial section of a top view of the disc brake.

In FIGS. 1 and 2, a pneumatically actuable disc brake is shown, which has a caliper 1 in the form of a fixed caliper, which straddles an upper peripheral area of a brake disc 2. Contemplated, yet not shown, is also an electromotively actuated disc brake.

On both sides of the brake disc 2, brake linings 3, 4 are arranged facing in the direction of the brake disc, i.e., perpendicular to its plane, which, as is customary, consist of a lining support plate 3a, 4a, and lining material 3b, 4b applied thereon.

The caliper 1 in FIG. 1, in its right lower section 21, which extends in the direction of an axle (not shown), is attached at an axle flange 22 of the disc brake.

Here, the brake disc 2 is embodied by way of example as a brake disc, which is displaceable relative to the caliper 1 on the axle by the amount of the power stroke to be overcome during braking actions. As an alternative, or in addition, the caliper 1 may also be displaceably or pivotably arranged. It is furthermore contemplated for the caliper 1 and/or the brake disc 2 to be realized as elastically deformable in one part of the path of the power stroke.

Since a relative movability is given between the caliper 1 and the brake disc 2, which essentially corresponds to the amount of the power stroke, an adjustment system 5, 6 is provided. This consists of adjustment devices 7, 8 on both sides of the disc brake 2, to balance the release clearance or the brake lining wear resulting from the braking action.

The adjustment devices 7, 8 consist here on each side of the disc brake 2, by way of example, of at least one or more, preferably two, adjustment sleeves 19, 20, in which bolt-like spindles 38, 39 of pressure pieces 11, 12, functioning as adjustment elements 9, 10, are carried pivotably in such a way that a relative axial displacement is provided between the adjustment sleeves 19, 20 and the pressure pieces 11, 12.

Of course, an opposite arrangement is contemplated as well, wherein the one- or multi-part pressure pieces 11, 12 have a sleeve-like shape 40, 41, in which a bolt, onto which a gear of the adjustment drive acts via an electric motor M, is carried pivotably. Such a sleeve-like realization of the adjustment elements 9, 10 can be seen in FIGS. 5 and 7.

The adjustment device 7 shown in FIG. 1 on the right side, is supported by a pivot lever 23 arranged next to it and pertaining to the brake application unit, which in its upper section is actuable by a piston rod 24 of a brake cylinder 25, and which in its lower section is borne, for example, by ball elements or by another bearing (not shown) at the caliper, and which on its side facing away from the caliper is borne at the adjustment sleeve 19 directly or via intermediate elements such as balls and/or other intermediate pieces.

The adjustment sleeve 20 arranged at the side of the brake disc 2 opposite the pivot lever 23, is, however directly supported on the inside of the caliper.

Figure 3:
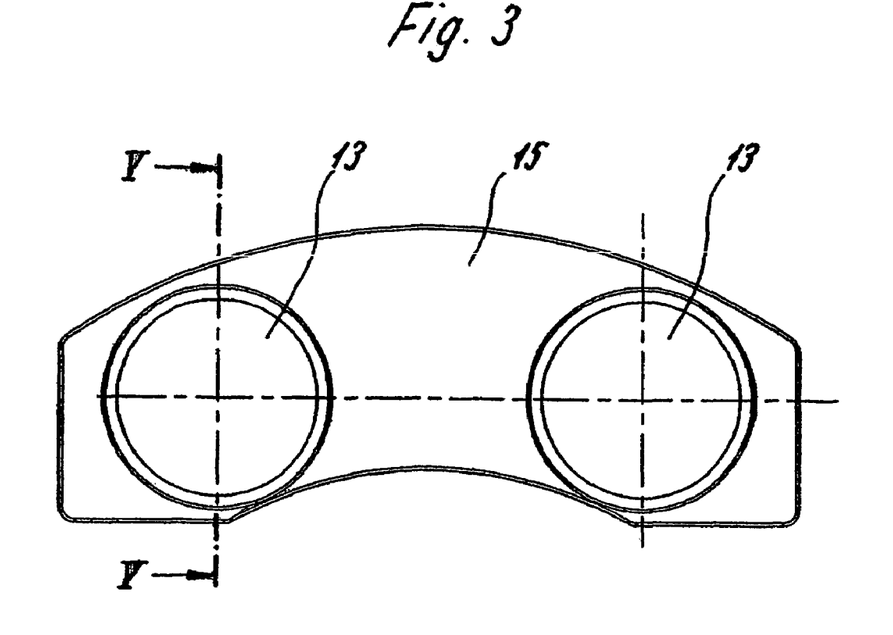
FIG. 3 is a detail view of the disc brake in a frontal view.

As can be seen, especially when the features of FIGS. 1 and 3 are combined, the two adjustment elements, which pertain to each respective adjustment system 5 or 6, and which extend in parallel to one another with a spacing therebetween, and which are movable in the direction of the brake disc 2 axially back and forth, are connected to one another on one side of the brake disc by a yoke-like connector plate 15 or 16, which may also be formed of sheet metal, in such a way that they are held torsion-resistantly relative to one another.

On their side that faces the disc brake, the connector plates 15, 16 are each, directly or indirectly, layered with a continuous, or only locally applied—e.g. realized in a circular form—heat-insulating layer 13, 14, which prevents the frictional heat that is created by the braking action from being conducted to further, downstream functional components. The connector plates 15 and 16, working in conjunction with the heat-insulating layers 13, 14, e.g. made of ceramic, function here as pressure pieces 11, 12.

The connector plates 15, 16 serve, apart from the support and securing of the torsion-resistance of the adjustment devices 7, 8, also as a protective shield for the functional components arranged behind them (e.g. the electric motor M) against heat radiation, since they completely or largely close openings realized in the caliper facing the brake disc, as is schematically indicated in FIG. 1.

By the torsion-resistant attachment of the pressure pieces 11, 12, and therefore of the adjustment elements 9,10, their joint axial displacement, and therefore a displacement of the brake linings 3, 4 is made possible, whereby in the realization of the adjustment elements 9, 10 the adjustment sleeve 19, 20 rotates as a threaded bolt, whereas if the adjustment elements 9, 10 are realized as a threaded sleeve, the correspondingly realized bolt can rotate therein.

Figure 4:
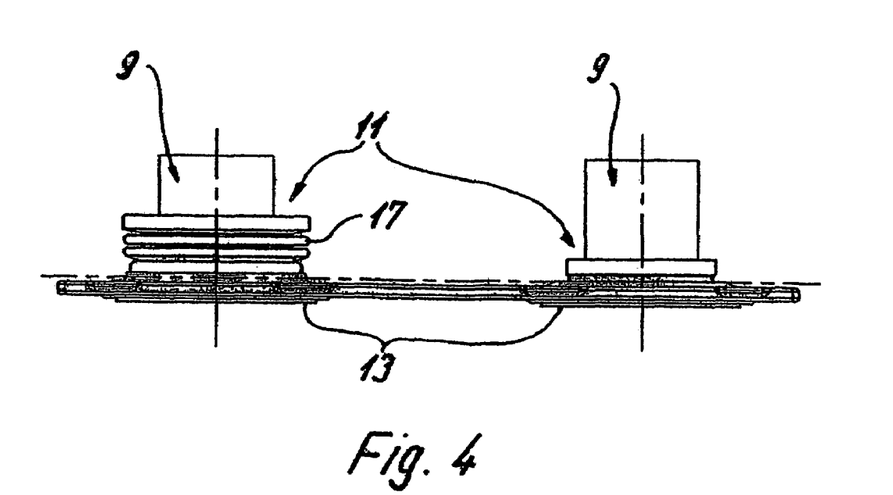
FIG. 4 is the detail view according to FIG. 3 in a plan view.
Figure 5:
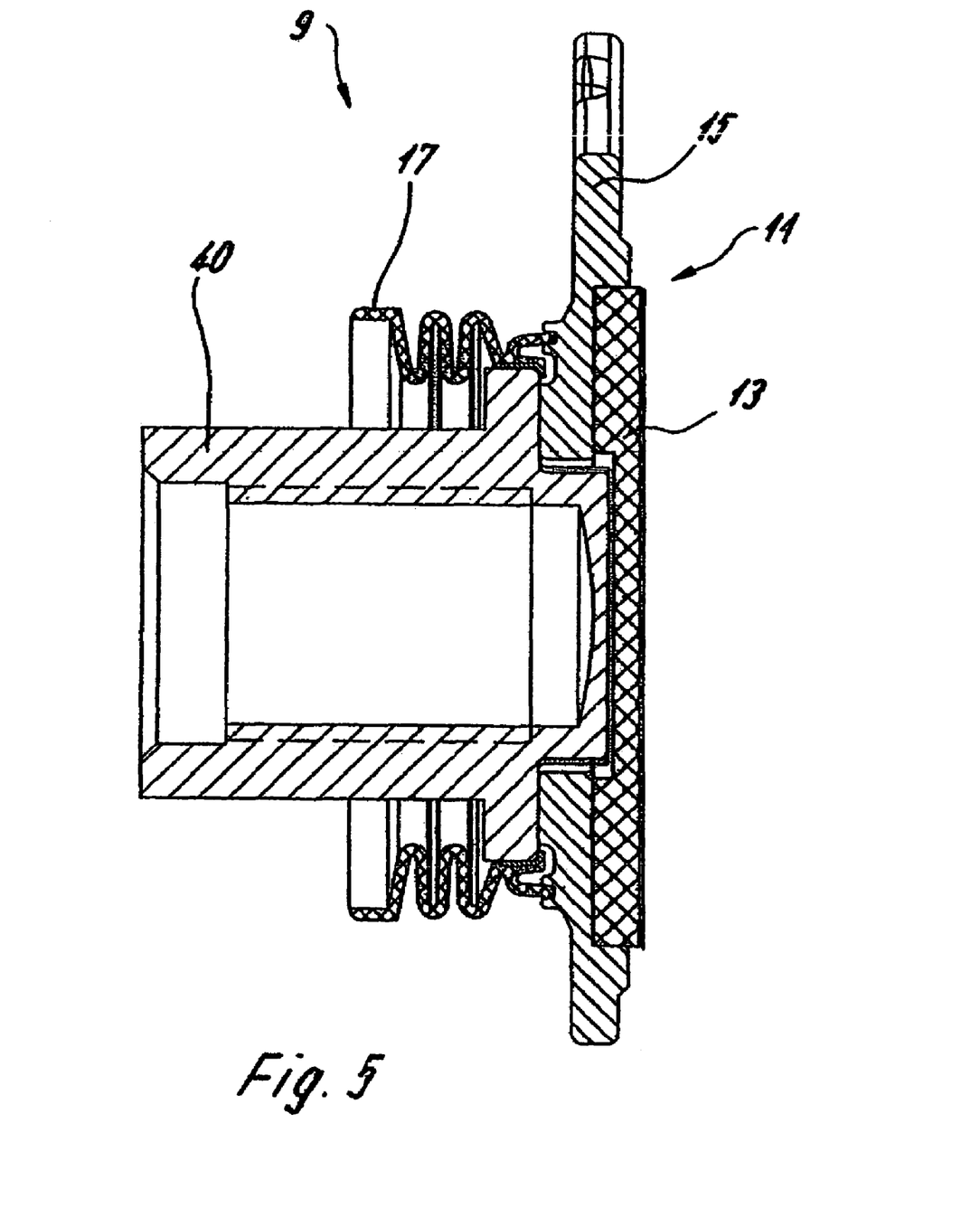
FIG. 5 is a cross-section through the detail view according to FIG. 3 along the line V-V in FIG. 3.

In FIGS. 3-5, an exemplary embodiment of the connector plate 15 with a thereto connected or positioned heat-insulating layer, in either case in two parts, is shown. The layer 13 forms the actual pressure contact surface against the brake lining.

As is especially represented in FIG. 3, the connector plate 15 is formed and dimensioned such that it largely covers the front side of a seat of the caliper 1 (FIG. 1), in which the respective adjustment system 5, 6 is positioned.

In the exemplary embodiment according to FIGS. 3 and 5, the heat-insulating layer 13 consists of two plates or discs, for example made of a ceramic, which are embedded in the connector plate 15, and are attached therein.

To protect against dirt and debris, the pressure piece 11 is covered up to an area that partially covers the adjustment element 9, by means of an expansion bellows 17, which, on the side facing away from the heat-insulating layer 13 of the connector plate 15, is attached thereto.

The expansion bellows 17 is, hereby, attached at its side that faces the connector plate 15 to an inner collar 45 on the pressure element 9, and to an outer collar 46 on the connector plate 15, which allows for the assembly, and the balancing out of radial movement between these components.

Figure 6:
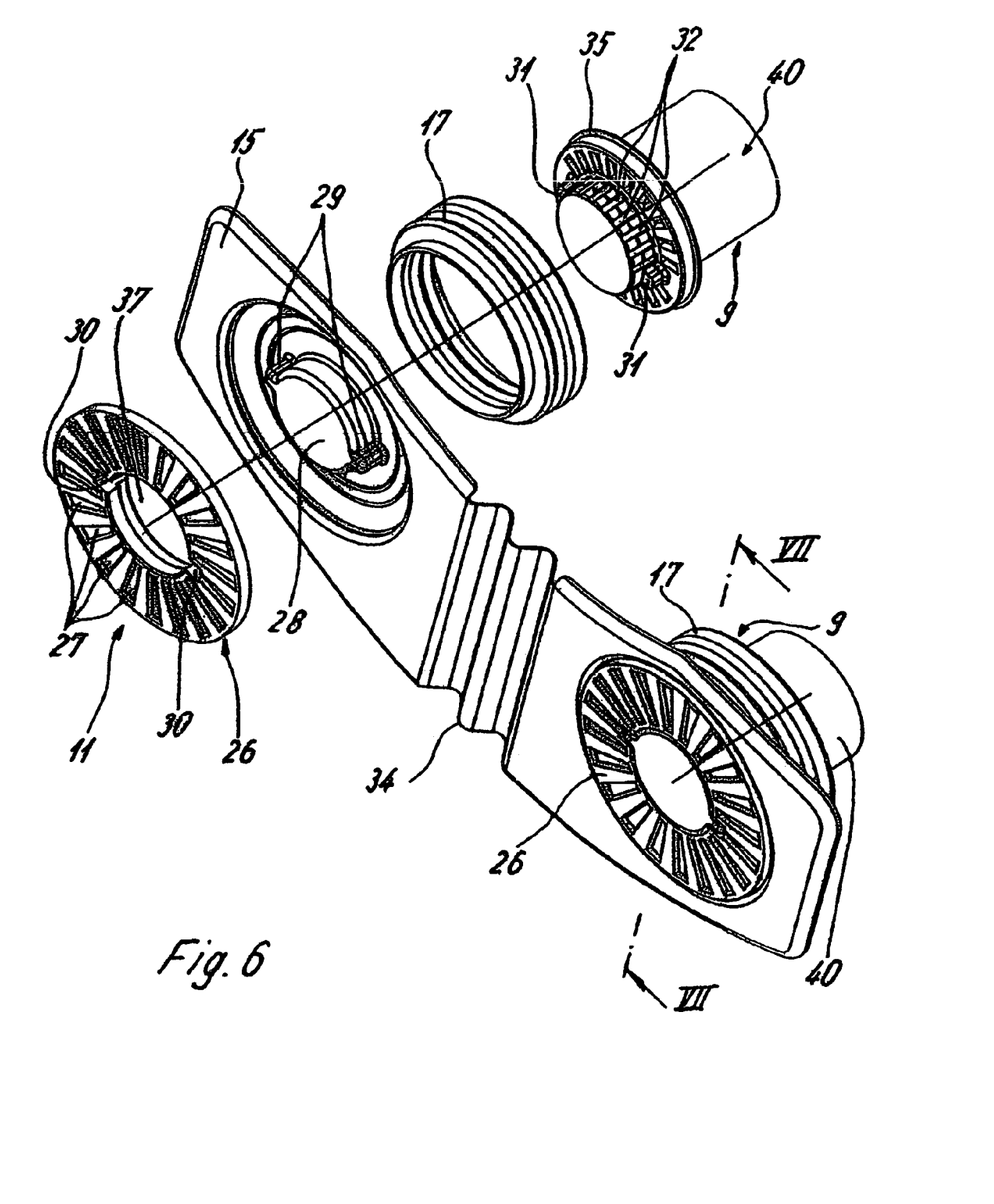
FIG. 6 is a further exemplary embodiment of details of a disc brake of the invention in an exploded view.
Figure 7:
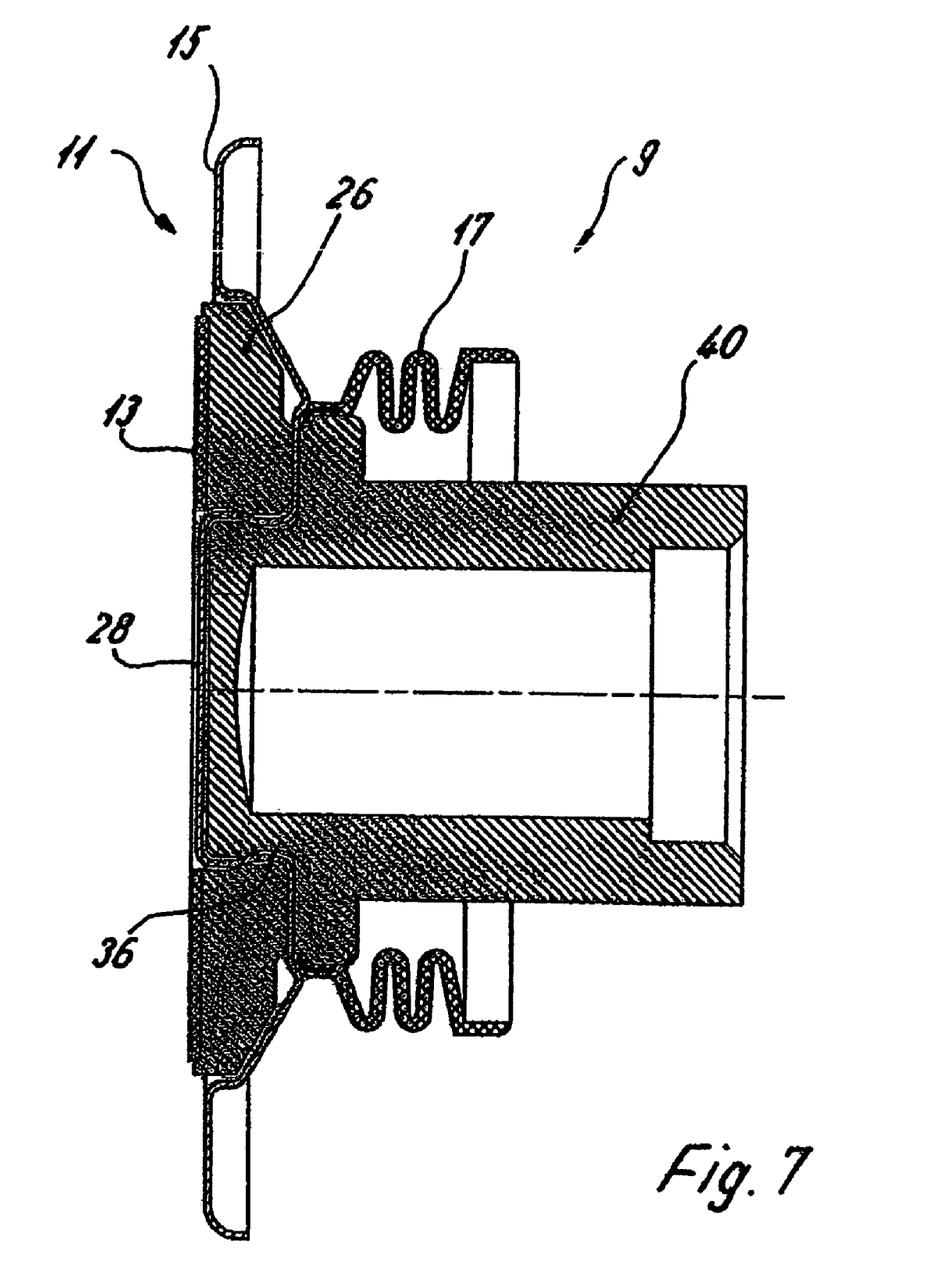
FIG. 7 is a cross-section through the detail according to FIG. 6 along the line VII-VII in FIG. 6.

A further exemplary embodiment of the invention is shown in FIGS. 6 and 7.

Herein, the sheet metal-like realized connector plate 15 has a crimp fold 34 in its center area, which balances out longitudinal changes caused by heat.

It is further shown that the connector plate 15 for seating the pressure piece plates 26 has a protuberance 28 in each case, which is provided with a closed bottom section, in which the facing terminal front area of the pressure piece plate 26 is embedded.

This protuberance 28 has radially arranged stop notches 29, which on an inside, due to the given shape, form a catch groove, into which noses 31 of the adjustment element 9 engage, whereby the stated securing of torsion-resistance is produced.

In the end area of the adjustment elements 9, 10 that faces the protuberance 28, radially extending slots 32 are provided on the surface area, which slots form both a heat insulation and breakthroughs 33, which are provided at a thereto formed collar 35 of the pressure piece 11, and which extend radially.

FIG. 7 shows that the end area of the pressure piece 11 embedded in the protuberance has an undercut 36 on its side surface. For axially fixing the pressure piece 11, a pressure piece plate 26 is pressed onto the protuberance 28, by means of which the surface area of the protuberance 28 is pressed into the undercut 36 of the adjustment element 9, wherein a corresponding formation of the pressure piece plate 26 rests against the surface of the protuberance 28 in this section.

The pressure piece plate 26 consists of radially extending recesses 27, which also serve as heat insulation, or an interruption of the heat transmission.

In the side walls of a center opening 37 of the pressure piece plate 26, catch grooves 30 are arranged, which correspond to the stop notches 29 of the protuberance 28, thereby securing the pressure piece plate 26 against torsion.

FIG. 7 shows that the heat-insulating layer 13 is attached onto the circular area of the pressure piece plate 26, namely on the side that faces the brake lining 3, 4.

Figure 8:
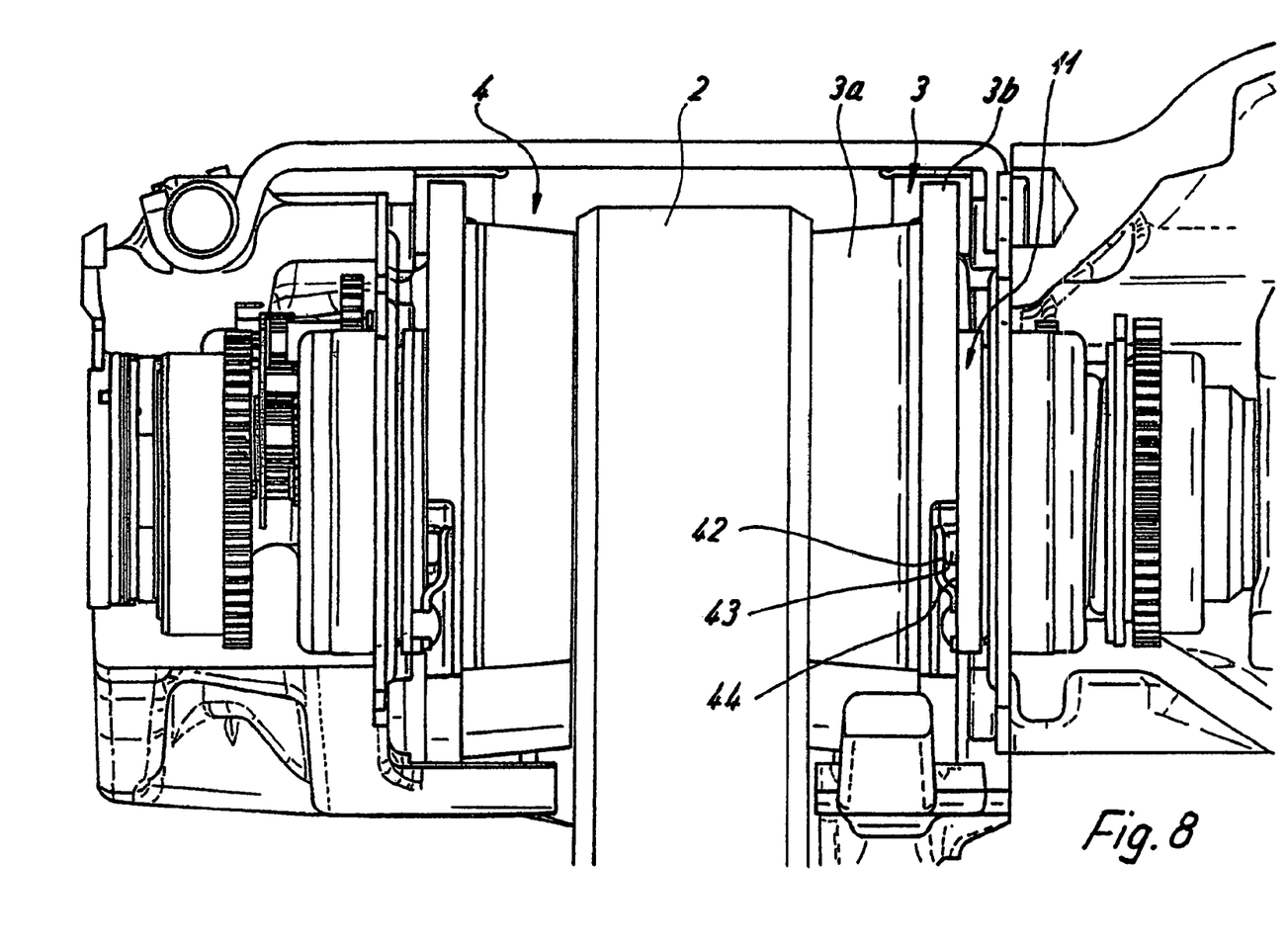
FIG. 8 is a cross-section through a caliper section of a further disc brake.

FIG. 8 makes clear that at the pressure piece 11, 12, or at another component at the adjustment element 9,10, on both sides of the brake disc 2, one or more plate springs 42 are joined, each undercutting a rod 43 in a recess 44 of the lining support. Thereby the pressure pieces 11, 12 are respectively connected to the lining support plates 3*b*, 4*b* in such a way that a retraction of the brake linings 3, 4 is guaranteed when the adjustment elements 9, 10 are turned back, and when the brake is released. The arrangement may also be reversed, i.e., so that the spring is formed onto the lining support plate, and engages into a recess at the adjustment element 9,10, or pressure piece 11, 12. The principle from FIG. 8 may also be utilized in the modifications in FIGS. 1 through 7.

TABLE OF REFERENCE NUMBERS

1 Caliper
2 Brake disc
3 Brake lining
3*a* Lining support plate
3*b* Lining material
4 Brake lining
4*a* Lining support plate
4*b* Lining material
5 Adjustment system
6 Adjustment system
7 Adjustment device
8 Adjustment device 9 Adjustment element
10 Adjustment element
11 Pressure piece
12 Pressure piece
13 Heat-insulation layer
14 Heat-insulation layer
15 Plate
16 Plate
17 Expansion bellows
18 Expansion bellows
19 Adjustment sleeve
20 Adjustment sleeve
21 Section
22 Axis flange
23 Pivot lever
24 Piston Rod
25 Brake cylinder
26 Pressure piece plate
27 Recess
28 Protuberance
29 Stop notch
30 Catch groove
31 Nose
32 Slot
33 Breakthrough
34 Crimp folding
35 Collar
36 Undercut
37 Center opening
38 Bolt-like spindle
39 Bolt-like spindle
40 Sleeve-like spindle
41 Sleeve-like spindle
42 Plate springs
43 Rod
44 Recess
45 Collar
46 Collar
M Electric motor

The invention claimed is:

1. A disc brake having a brake disc, for a commercial vehicle, operated pneumatically or by an electric motor, the disc brake comprising:
  a caliper which, in use, straddles the brake disc;
  a brake application unit arranged in the caliper for applying a braking force;
  at least one adjustment device arranged in the caliper for offsetting at least one of brake lining and brake disc wear, said at least one adjustment device comprising two axially displaceable adjustment elements, each of which has a respective pressure piece plate which forms a pressure piece;
  a common connector plate in which end areas of the two adjustment elements which face a respective brake lining are fixed in a torsion resistant manner, the respective pressure piece plates being positioned on the common connector plate; and
  wherein a single or multi-part heat insulation layer is attached, at least in sections, on the respective pressure piece plates on a side thereof facing the respective brake lining.

2. The disc brake according to claim 1, wherein the connector plate is a thermal shield dimensioned such that it largely covers an opening, which faces the brake disc, of an installation space in the caliper in which the adjustment device is arranged.

3. The disc brake according to claim 2, further comprising an electric motor drive operably coupled to the at least one adjustment device.

4. The disc brake according to claim 1, wherein an adjustment device is arranged in the caliper on each side of the brake disc.

5. The disc brake according to claim 1, further comprising an electric motor drive operably coupled to the at least one adjustment device.

6. The disc brake according to claim 1, wherein the heat insulation layer is formed of a ceramic material.

7. The disc brake according to claim 1, wherein the respective pressure piece plate is arranged flush with a surface of the connector plate and held in an axial and torsion-resistant manner.

8. The disc brake according to claim 1, wherein the connector plate is provided with protuberances in a connection area with the adjustment elements facing the brake lining, said adjustment elements being fixed axially and torsion-resistantly in said connection area.

9. The disc brake according to claim 1, further comprising expansion bellows coupled to the connector plate and covering the adjustment element at least partially.

10. The disc brake according to claim 9, wherein the expansion bellows is attached, at an end facing the connector plate, to an inner collar at the pressure element, and to an outer collar at the connector plate.

11. The disc brake according to claim 1, wherein the connector plate has a wave fold in a center area extending transverse to a longitudinal extent of the connector plate.

12. The disc brake according to claim 1, wherein the pressure pieces and a respective brake lining are coupled to one another such that a retraction of the brake lining occurs when the adjustment elements are retracted, and when the brake is released.

13. The disc brake according to claim 12, further comprising one or more plate springs arranged at one of the pressure piece or a component of the adjustment element, said one or more plate springs being operatively configured to extend under a rod in a recess of the a lining support plate for the brake lining.

14. The disc brake according to claim 12, wherein at a lining support plate of the brake lining, one or more plate springs are arranged, which plate springs are operatively configured to engage in a recess of the pressure piece or a component of the adjustment element coupled to the pressure piece.

15. A disc brake having a brake disc, for a commercial vehicle, operated pneumatically or by an electric motor, the disc brake comprising:
  a caliper which, in use, straddles the brake disc;
  a brake application unit arranged in the caliper for applying a braking force;
  at least one adjustment device arranged in the caliper for offsetting at least one of brake lining and brake disc wear, said at least one adjustment device comprising two axially displaceable adjustment elements, each of which has a respective pressure piece;
  a common connector plate in which end areas of the two adjustment elements which face a respective brake lining are fixed in a torsion resistant manner;
  wherein a single or multi-part heat insulation layer is attached, at least in sections, at at least one of the connector plate and the pressure piece on a side facing the respective brake lining;

wherein a pressure piece plate forms the pressure piece and is positioned on the connector plate, the pressure piece plate bearing the heat insulation layer;

wherein the pressure piece plate is arranged flush with a surface of the connector plate and held in an axial and torsion-resistant manner; and wherein the pressure piece plate includes recesses formed therein.

16. A disc brake having a brake disc, for a commercial vehicle, operated pneumatically or by an electric motor, the disc brake comprising:

a caliper which, in use, straddles the brake disc;

a brake application unit arranged in the caliper for applying a braking force;

at least one adjustment device arranged in the caliper for offsetting at least one of brake lining and brake disc wear, said at least one adjustment device comprising two axially displaceable adjustment elements, each of which has a respective pressure piece;

a common connector plate in which end areas of the two adjustment elements which face a respective brake lining are fixed in a torsion resistant manner;

wherein a single or multi-part heat insulation layer is attached, at least in sections, at at least one of the connector plate and the pressure piece on a side facing the respective brake lining;

wherein the connector plate is provided with protuberances in a connection area with the adjustment elements facing the brake lining, said adjustment elements being fixed axially and torsion-resistantly in said connection area; and wherein said protuberances have a cylindrical-shape and include stop notches, which stop notches form catch grooves on an outer surface for the pressure piece plate and on an inner surface form catch grooves corresponding to noses of the adjustment element.

17. A disc brake having a brake disc, for a commercial vehicle, operated pneumatically or by an electric motor, the disc brake comprising:

a caliper which, in use, straddles the brake disc;

a brake application unit arranged in the caliper for applying a braking force;

at least one adjustment device arranged in the caliper for offsetting at least one of brake lining and brake disc wear, said at least one adjustment device comprising two axially displaceable adjustment elements, each of which has a respective pressure piece;

a common connector plate in which end areas of the two adjustment elements which face a respective brake lining are fixed in a torsion resistant manner;

wherein a single or multi-part heat insulation layer is attached, at least in sections, at at least one of the connector plate and the pressure piece on a side facing the respective brake lining;

wherein the connector plate is provided with protuberances in a connection area with the adjustment elements facing the brake lining, said adjustment elements being fixed axially and torsion-resistantly in said connection area; and wherein the area of the adjustment element that extends into the protuberance has, on a side surface thereof, slots which extend through the material.

18. The disc brake according to claim 17, wherein the adjustment element includes a peripheral collar that rests against the connector plate.

19. The disc brake according to claim 18, wherein said collar includes breakthroughs.

20. The disc brake according to claim 18, wherein an undercut is formed on an end area of the adjustment element that extends into the protuberance and which is adjacent the collar, into which said undercut a correspondingly formed nose of the pressure piece plate engages by pressing into a surface area of the protuberance.

21. The disc brake according to claim 20, wherein the pressure piece plate is formed in a circular shape having a center opening that engages in the undercut of the adjustment element.

* * * * *